(12) United States Patent
Garcia (10) Patent No.: US 9,471,466 B1
(45) Date of Patent: Oct. 18, 2016

(54) END-TO-END IN-BROWSER WEB-APPLICATION DEBUGGING

(71) Applicant: SAP SE, Walldorf (DE)

(72) Inventor: Marcos Del Puerto Garcia, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/724,304

(22) Filed: May 28, 2015

(51) Int. Cl.
  G06F 9/44 (2006.01)
  G06F 11/36 (2006.01)
  H04L 29/08 (2006.01)

(52) U.S. Cl.
  CPC ....... G06F 11/3664 (2013.01); G06F 11/3644 (2013.01); H04L 67/025 (2013.01); H04L 67/10 (2013.01)

(58) Field of Classification Search
  None
  See application file for complete search history.

(56) References Cited

U.S. PATENT DOCUMENTS

| | | | | |
|---|---|---|---|---|
| 5,787,245 A * | 7/1998 | You | ..................... | G06F 11/3664 714/38.13 |
| 5,933,639 A * | 8/1999 | Meier | ..................... | G06F 11/362 714/E11.21 |
| 6,668,369 B1 * | 12/2003 | Krebs | ..................... | G06F 11/3664 714/E11.217 |
| 2002/0066071 A1 * | 5/2002 | Tien | ..................... | G06F 11/3664 717/102 |
| 2005/0138113 A1 * | 6/2005 | Brendle | ..................... | H04L 29/06 709/203 |
| 2005/0144599 A1 * | 6/2005 | Styles | ..................... | G06F 11/3624 717/140 |
| 2010/0287562 A1 * | 11/2010 | Jazdzewski | ..................... | G06F 11/3664 719/313 |
| 2012/0151452 A1 * | 6/2012 | Zinkovsky | ..................... | G06F 11/362 717/129 |
| 2013/0185770 A1 * | 7/2013 | Patil | ..................... | H04L 63/08 726/4 |

OTHER PUBLICATIONS

Microsoft, "Debugging COM Clients and Servers Using RPC Debugging", http://msdn.microsoft.com/en-us/library/aa734022(v=vs.60).aspx, Internet Archive Sep. 14, 2014, accessed on Jan. 27, 2016.*

Aguilera et al., "Performance debugging for distributed systems of black boxes", Processings of the nineteenth ACM symposium on Operating systems principles SOSP '03, vol. 37, Issue 5, Dec. 2003, pp. 74-89.*

* cited by examiner

Primary Examiner — Wei Zhen
Assistant Examiner — Timothy Duncan
(74) Attorney, Agent, or Firm — Schwegman Lundberg & Woessner, P.A.

(57) ABSTRACT

Described herein are various embodiments of computer-implemented tools, systems, and methods for managing debugging of different portions of an application (e.g., front-end and back-end) with different respective debuggers in a manner that facilitates debugging the entire application from within the user interface associated with one of the debuggers (e.g., from within a browser interface). In some embodiments, a debug manager acts as a bridge between a web-browser debugger and a back-end debugger, allowing an application developer to debug web applications without leaving the browser.

20 Claims, 7 Drawing Sheets

END-TO-END IN-BROWSER WEB-APPLICATION DEBUGGING

This document relates generally to the debugging of software applications, and more particularly to systems and methods for debugging web applications.

BACKGROUND

In many web applications, the front-end is programmed using a different language than the back-end. For example, in business applications with web interfaces, the front-end code implementing the client-side business logic may be written, e.g., in JavaScript, Dart, CoffeeScript, or TypeScript, and the back-end code executing the server-side business application logic (e.g., by accessing a database and processing the data retrieved therefrom) may be implemented in Java or a business-application-specific language. Debugging such programs may involve the use of, and frequent switching between, two separate debuggers for the front-end and the back-end. A developer may, for instance, step through the front-end code using a debugger integrated into a web browser (e g, running on a client computer) and, upon reaching a line of code that includes a request sent to the back-end, manually identify the portion of back-end code servicing the request and debug that portion, e.g., by placing a break-point therein, with a debugger specific to the programming language of the back-end (which may be running, e.g., on an application server remotely accessed by the client computer). Thereafter, debugging of the front-end may be resumed; in some cases, this involves re-starting the program. This process is often cumbersome and takes up valuable developer time.

BRIEF DESCRIPTION OF INVENTION

The present disclosure illustrates embodiments of the inventive subject matter by way of example and not limitation, and with reference to the following drawings.

DETAILED DESCRIPTION

The description that follows includes systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein are computer-implemented tools, systems, and methods for managing debugging different portions of an application (e.g., front-end and back-end) with different respective debuggers in a manner that facilitates debugging the entire application from within the user interface associated with one of the debuggers (e.g., from within a browser interface). In some embodiments, a debug manager tool (implemented in hardware and/or software, and hereinafter simply referred to as the "debug manager") acts as a bridge between a web-browser debugger and a back-end debugger, allowing an application developer to debug web applications without leaving the browser. The debug manager may provide a connection service that identifies, in response to receipt of a network request from the browser, a server to handle the request, as well as a debug-request service that translates debug requests from the web browser into a format understandable by the back-end debugger. The debug manager may be a generic component that is adaptable, via suitable front-end and back-end plugins, to operate with various browsers and/or back-end debuggers.

Figure 1:
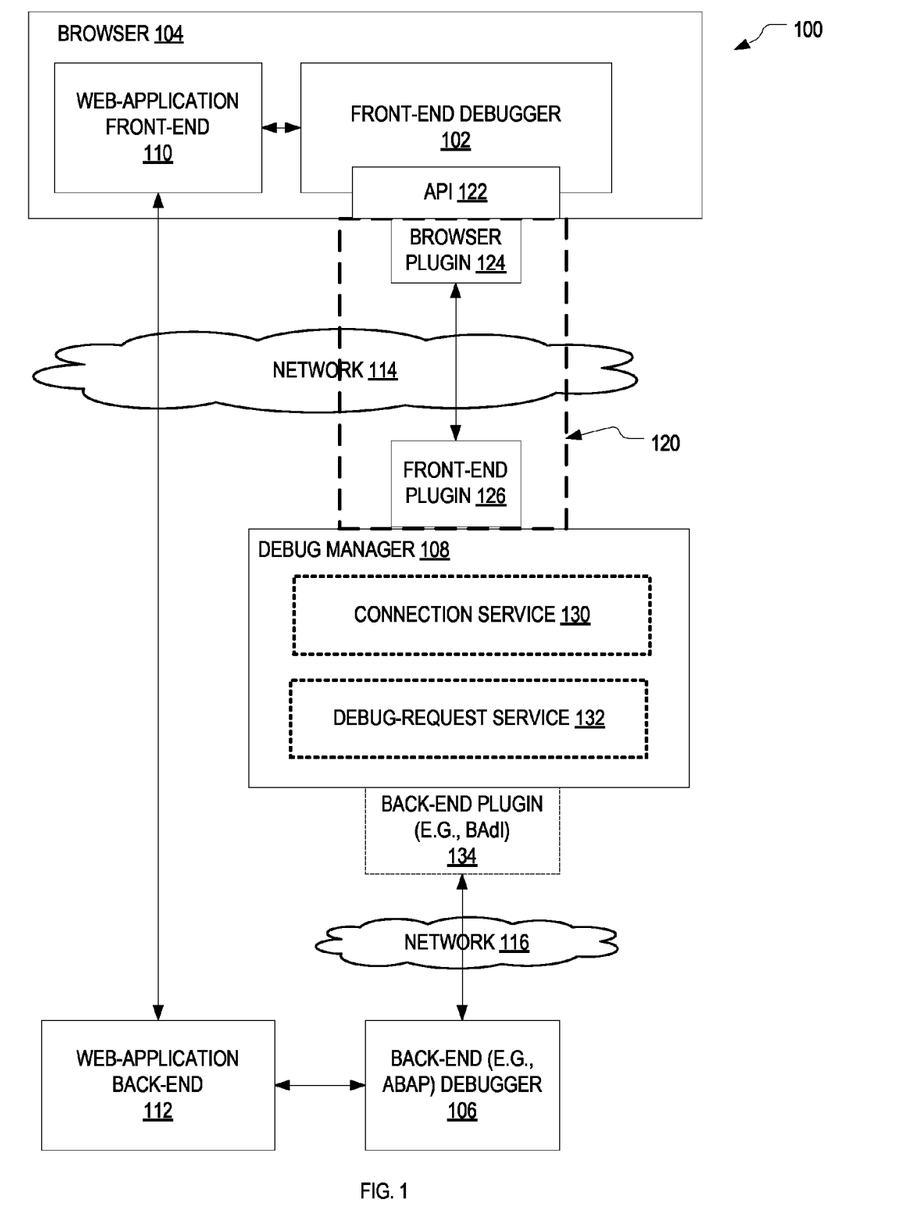
FIG. 1 is a block diagram illustrating a debug system, in accordance with an example embodiment, for debugging a web application from within a web browser.

FIG. 1 is a block diagram illustrating a debug system, in accordance with an example embodiment, for debugging a web application from within a web browser. The debug system 100 includes a front-end debugger 102 integrated into a web browser 104, a back-end debugger 106, and a debug manager 108 that channels and translates debug requests and responses between the front-end debugger 102 and the back-end debugger 106, as explained in more detail below. The browser 104 may execute on a client device (such as, e.g., a desktop or laptop computer, tablet computer, smart phone, etc.), and may, during execution of a web application (whose front-end code is indicated at 110), communicate via a network 114 (such as, e.g., the Internet) with a back-end application server (or group of servers) hosting the back-end application code 112 and the associated back-end debugger 106. During debugging of the web application, requests from the browser 104 to the back-end application server and back-end-server responses to the browser 104 may be routed through the debug manager 108. The debug manager 108 may be connected to the browser 104 and the back-end debugger 106 via respective networks 114, 116 (which may be the same or different networks). In some example embodiments, the debug manager 108 is associated more closely with the back-end application server than with the client device. For example, the debug manager 108 may be hosted on a separate server connected to the back-end application server via an intranet of an organization (network 116), and with the browser 104 via the Internet. Alternatively, the debug manager 108 may be implemented directly on the back-end application server. In principle, it is also possible to implement the debug manager 108 on the client device, e.g., using the Common Object Request Broker Architecture (CORBA) standard or the Distributed Component Object Model (DCOM); however, a server-side debug-manager may be amenable to a simpler, and thus preferable, implementation. In general, as used hereinafter, the term "server" encompasses both a single computer and a group of communicatively coupled computers adapted to perform a certain set of services. For example, the back-end application server may execute multiple instances of the back-end application code on multiple machines to service request from multiple clients, and one or more instances of the back-end debugger 106 may run on any one or more of these machines or on a separate machine in communication therewith (e.g., via network 116).

The browser 104 may be, for example, Google Chrome® or Mozilla Firefox®, or generally any browser with integrated debugging functionality. The system 100 may include a front-end adapter 120 that translates browser-specific representations of debug requests and associated data into a generic representation. This renders the debug manager 108 browser-independent and operable in conjunction with each front-end debugger 102 for which a front-end adapter 120 is provided. The front-end adapter 120 may interface with the respective browsers 104 and/or extendable browser-integrated front-end debuggers 102 via application programming interfaces (APIs) 122, as are often provided along with browsers as part of, for instance, software development kits (SDKs). Suitable APIs are available, for instance, for Chrome® and Firefox® browser debuggers. The front-end adapter 120 may generally reside along with the browser on the client device, or on the server hosting the debug manager 108, or partially on both. For example, as illustrated, the front-end adapter 120 may include a browser plugin 124 downloaded to the client device and a front-end plugin executing on the same server as the debug manager 108. The browser plugin 124 may translate debug requests received from a user via the user interface of the front-end debugger 102 into browser-generic debug requests, which may be formatted in accordance with any of a variety of interaction protocols, e.g., as OData payload of a request method or as an XML payload of a remote procedure call. The front-end plugin 126 may process the received debug requests, e.g., to enter them in a generic format into the debug-request list of the debug manager 108.

The debug manager 108 provides two distinct services (among other functionality): a connection service 130 and a debug-request service 132. In some example embodiments, these two services 130, 132 are implemented as distinct (e.g., software) modules; in other example embodiments, their functionality is provided in an integrated single module. The connection service 130 maintains or has access to a list of server-client connections that it consults, in response to a network request received from the browser 104, to identify the particular server computer to which the request should be forwarded and, if applicable, the particular session to which the request belongs. A client device may, for instance, execute in parallel multiple web applications, or multiple instances of the same web application, each in a different session. Similarly, the back-end server may run multiple applications, or multiple instances of the same application, in multiple sessions for one or more clients. The connection service 130 identifies, for each incoming network requests (e.g., processing requests to be performed by the application back-end 112), which client devices is making the request and for which specific session, as well as which server computer (with which Internet Protocol (IP) address) is to handle the request. The connection service 130 than forwards the request to the proper server computer. The server computer may identify which portion of the back-end application code portion is to process the request, and return the identified code portion via the debug manager 108 to the browser 104, where the user may enter specific debug requests (e.g., set breakpoints, watches, etc.).

The debug-request service 132 manages debug requests received from the browser 104, for instance, by dispatching the requests synchronously or asynchronously as desired, and/or by converting the request into a language and format that is understandable by the back-end debugger. In some embodiments, the debug-request service 132 is specific to a particular type of back-end debugger 106, and directly outputs debug requests in the format in which they are used by the back-end debugger 106. Alternatively, in some embodiments, at least part of the functionality for adapting the debug-request format to the back-end debugger 106 is provided by a back-end plugin 134, rendering the debug-request service 132 suitable for use with multiple back-end debuggers 106 for which back-end plugins 134 are available. In one example embodiment, the back-end server executes back-end applications code written in the Advanced Business Application Programming (ABAP) language developed by SAP SE (headquartered in Walldorf, Germany), and provides an associated ABAP debugger. The back-end plugin 134 may, in this embodiment, be implemented using the Business Add-in (BAdI) framework provided for ABAP applications. Further plugins 134 may be provided for applications written, for example, in Java, C, or any other suitable programming language.

Figure 2A:
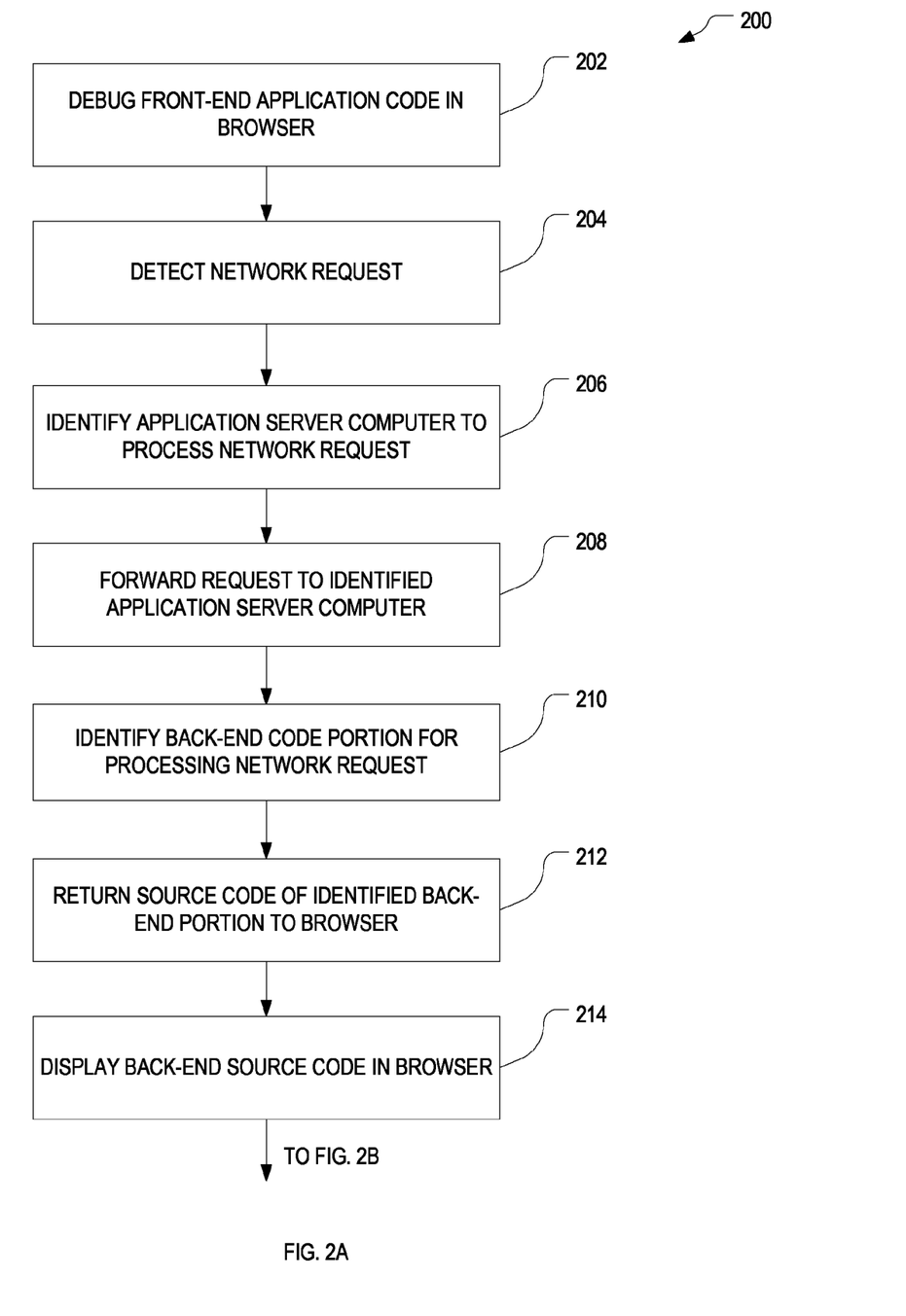
FIGS. 2A and 2B provide a flow chart illustrating a debug process, in accordance with an example embodiment, for debugging a web application from within a browser.
Figure 2B:
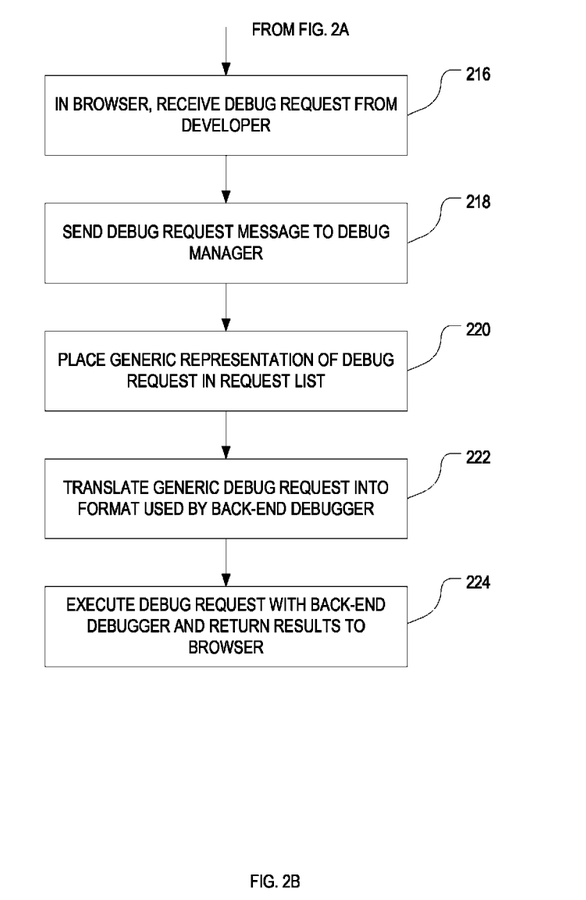

FIGS. 2A and 2B provide a flow chart illustrating a debug process, in accordance with an example embodiment, for debugging a web application from within a browser. As shown in FIG. 2A, the debug process 200 involves a user (e.g., an application developer) debugging the front-end code 110 of a web application in a conventional manner within a browser 104, using an integrated browser debugger 102 (operation 202). The browser is able to detect, at operation 204, when execution of the application in debug-mode reaches a point where a network request to the back-end server is made; functionality to detect such network requests is routinely provided in many currently available browsers. In response to detection of a network request, the browser 104 communicates with a debug manager 108. At the debug manager 108, the specific connection associated with the request, and thus the server computer that is to process the request, are identified (operation 206), and the request is forwarded to the identified server computer (operation 208).

To identify the connection associated with a given incoming request, the debug manager 108 (e.g., via its connection service 130) may consult a list of connections as may be maintained, for instance, by an Internet connection monitor that is part of the (existing) application-execution infrastructure. In some scenarios, the server computer and client device are in the same network (e.g., the intranet of an organization), and are directly identified by their respective IP addresses, so that no further address resolution is needed. In other scenarios, the server computer and client device are separated by an external network (such as the Internet) that works with a transparent proxy or with plug-and-play network address translation. In this case, there is, likewise, no further address translation needed, as the network protocols being used reveal the true network address of the client device to the server. In yet other scenarios, a (non-transparent) proxy server or program acts as an intermediary between the client device on the one end and the application server and server hosting the debug manager on the other end, and conceals the address of the client device, e.g., for security reasons. In this case, if the application server and/or the debug-manager server are white-listed for the proxy server, they can send (e.g., via the connection service 130) an inquiry to the proxy server, requesting the true network address of the client device; upon receipt of the requested network address, the proper connection and session can be determined. Otherwise, if the application server and/or debug-manager server have no way of obtaining the network address of the client device, the fallback mechanism is to have the client device send further information that unequivocally identifies the connection when a debug session is started, or opens a separate connection that will be transferred to the debug-request service and thereafter be used to send and receive all debug information.

Still with reference to FIG. 2A, once the identified application-server computer receives the forwarded network request, it identifies the portion of back-end code that is responsible for servicing the request (operation 210), and returns the corresponding source code, via the debug manager 108, to the browser 104 (operation 212). The browser 104 may display the source code, e.g., in a display panel shown alongside a panel showing the front-end application code 110, or in the same panel interspersed with the front-end application code 110 (operation 214). The user may then make debug requests for the back-end code in the same manner as for the front-end code. Such debug requests include, for example, setting a breakpoint or conditional breakpoint, setting a watch; forcing a value, sending a signal, or displaying a call stack, as well as step, break, resume, runs, and continue requests.

With reference to FIG. 2B, upon receipt of the developer's debug request in the browser 104 (operation 216), the request is encapsulated in request message (e.g., by a browser plugin 124) and sent to the debug manager 108 (operation 218), where a generic representation of the debug request may be placed into a request list (e.g., by a front-end plugin 126) to be processed by the debug-request service 132 (operation 220). The debug-request service 132 and/or the back-end plugin 134 translate the generic debug request into the specific format used by the back-end debugger 106 (operation 222). For example, the debug operation of setting a break point at a given function within the code may translate to a command "BREAK FUNCTION$." Upon receipt, the back-end debugger 106 executes the requested debug operation and returns the results, encapsulated in a response message, via the debug manager 108 to the browser 104 (operation 224). The response message may, for example, include the values of certain variables for which a watch was requested.

As part of managing and translating the debug requests, the debug-request service 132 may further serve to translate between synchronous and asynchronous requests. For example, if the client device requests a debug operation (such as, e.g., sending a signal or message to a given process) that is a synchronous operation client-side, but is executed asynchronously on the back-end debugger, the debug-request service forwards the synchronous request from the client asynchronously to the back-end debugger 106, but does not answer the client device until it has received a response message from the back-end debugger 106 or a time-out has been triggered. To do so, the debug-request service may use a busy-waiting technique in which it repeatedly polls the state of a flag or return value, or simply be suspended until the response from the back-end debugger arrives. Conversely, the debug-request service may also convert asynchronous requests from the client device to synchronous requests. For example, to set a conditional breakpoint (that is, a breakpoint that is only triggered when a particular condition or set of conditions is met, such as when a certain variable has a specified value), the client device may send a corresponding request to the debug-request service 132 and then subscribe to the requested operation or wait for a message coming from the debug-request service. The debug-request service 132 and/or back-end plugin then cause execution of the operation in a sequential manner, using synchronous requests, or pausing and resuming program execution cyclically (e.g., by sending requests to the back-end debugger to stop, check the value, perform another step, stop again, and so on until the specified condition is met).

Figure 3A:
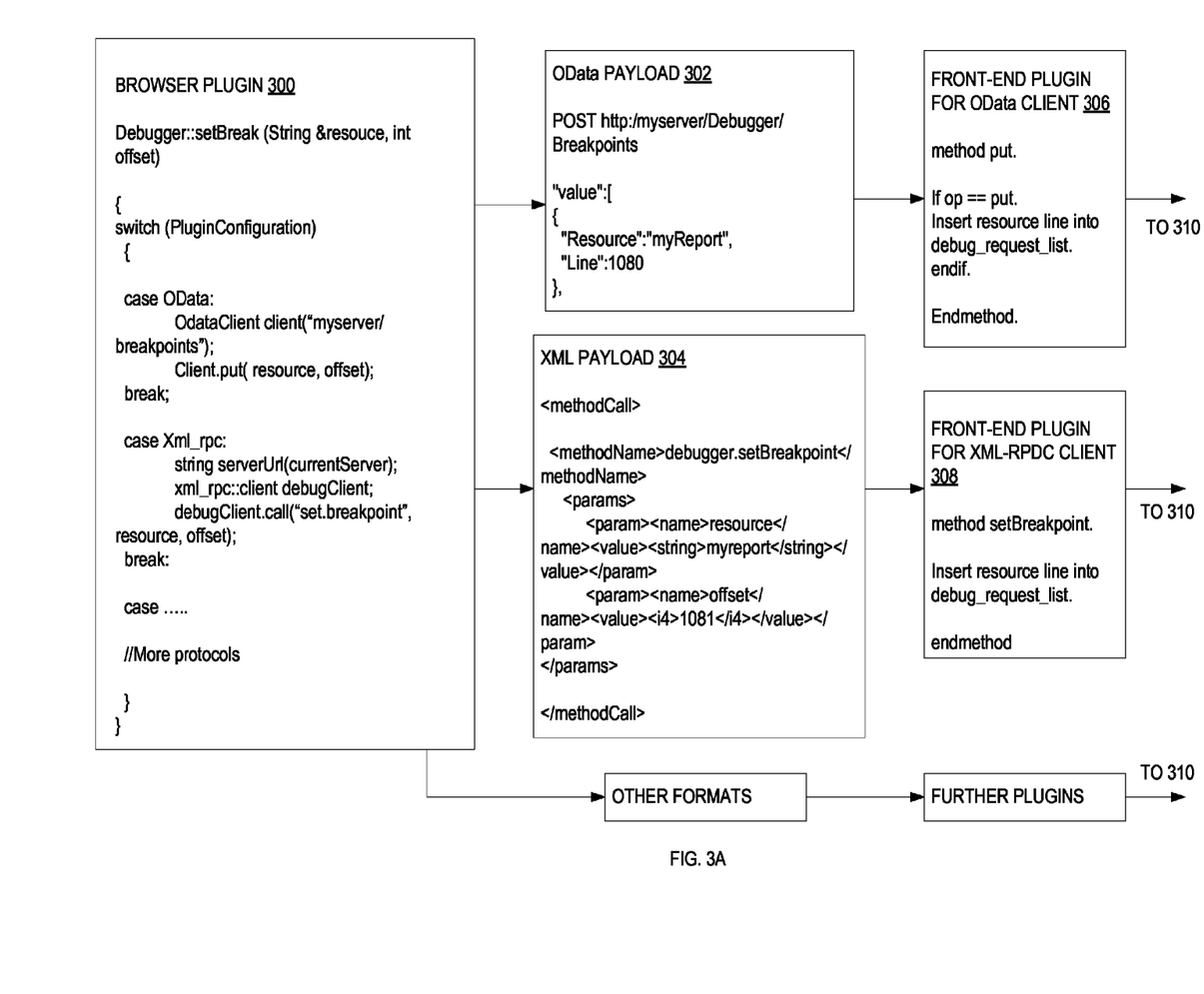
FIGS. 3A and 3B depict example code snippets illustrating the translation of a debug request between the browser and the back-end debugger, in accordance with some example embodiments.
Figure 3B:
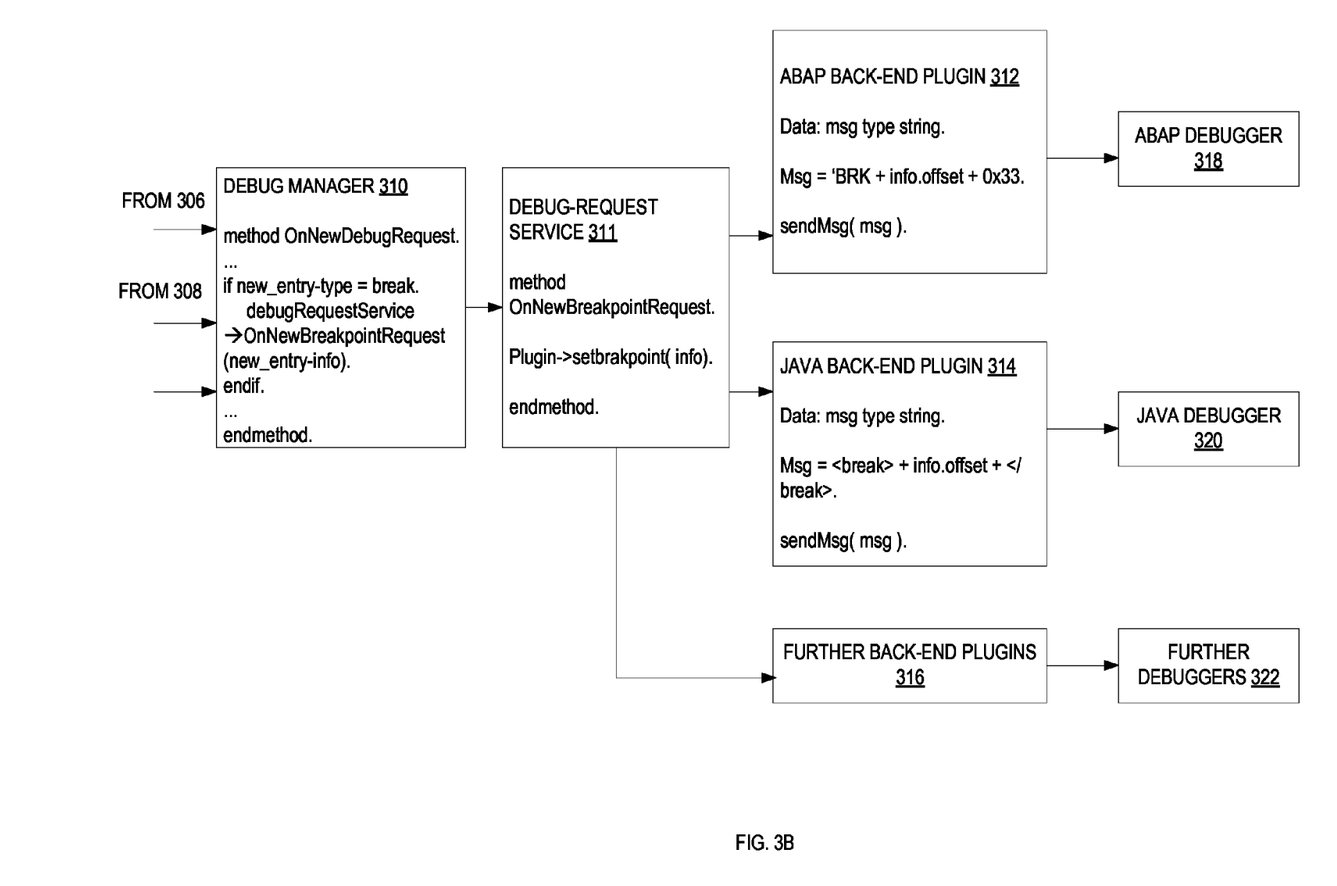

FIGS. 3A and 3B depict example code snippets illustrating the translation of a debug request between the browser and the back-end debugger, in accordance with some example embodiments. In the example shown, the debug request is a request to set a breakpoint within a given file of source code (the "resource") at a given line (the "offset"). This debug request may be represented in the browser debugger as a command "Debugger::setBreak" that takes two arguments: a string specifying the resource and an integer specifying the offset. As shown, the browser plugin 300 may be configured to convert this representation into one of multiple message formats. For example, the request may be translated into an OData Payload 302 that uses the Hypertext Transfer Protocol (HTTP) request method "POST" and specifies the resource (e.g., "myReport") and offset (e.g., "1080," corresponding to line 1080 within the source-code file "myReport") in the message payload. Alternatively, the request may be translated into an XML remote procedure call (RPC) 304 in which the resource and offset are provided as parameters. Further protocols may be supported. A suitable front-end plugin adapted to the particular message format, e.g., a front-end plugin 306 for an OData client or a front-end plugin 308 for an XML-RPC client, may process the respective request message and, based thereon, insert an entry specifying the resource and offset in a debug request list. The debug manager 310 may inform the debug-request service 311 of the new request entered into the debug request list and of the type of requested debug operation. Alternatively, the debug-request service may fetch new entries on its own. The debug-request service 311 may read this debug request list, and utilize one of multiple back-end plugins 312, 314, 316 to generate a request message whose message string includes the request in a format understandable by the respective back-end debugger 318, 320, 322. For example, for ABAP application debugging, the message string created by the associated ABAP back-end plugin 312 may read "BRK+info.offset+0x33," whereas for JAVA applications, the message string generated by the JAVA back-end plugin 314 may read "<break>+info.offset=</break>. As will be readily appreciated by those of ordinary skill in the art, these are merely examples, and back-end application code written in other programming languages can similarly supported by providing back-end plugins that suitably translate the debug requests.

Beneficially, the systems and methods disclosed herein allow a developer to test and debug a web application in its entirety from within the web browser, obviating the need to switch back and forth between multiple debuggers and/or to manually identify back-end code portions that handle particular network requests. This increased convenience can translate into faster application development and, consequently, development cost savings.

While example embodiments are described herein with reference to web applications and debugging both front-end and back-end code inside a web browser, the disclosed systems and methods are more generally applicable to debugging two or more portions of a software application (written in potentially two or more different programming languages) using different respective debuggers, but from within a single debug interface associated with one of the debuggers that remotely accesses the other debuggers via a debug manager substantially as described in conjunction with suitable adapters and plugins.

Modules, Components, and Logic

Certain example embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 4:
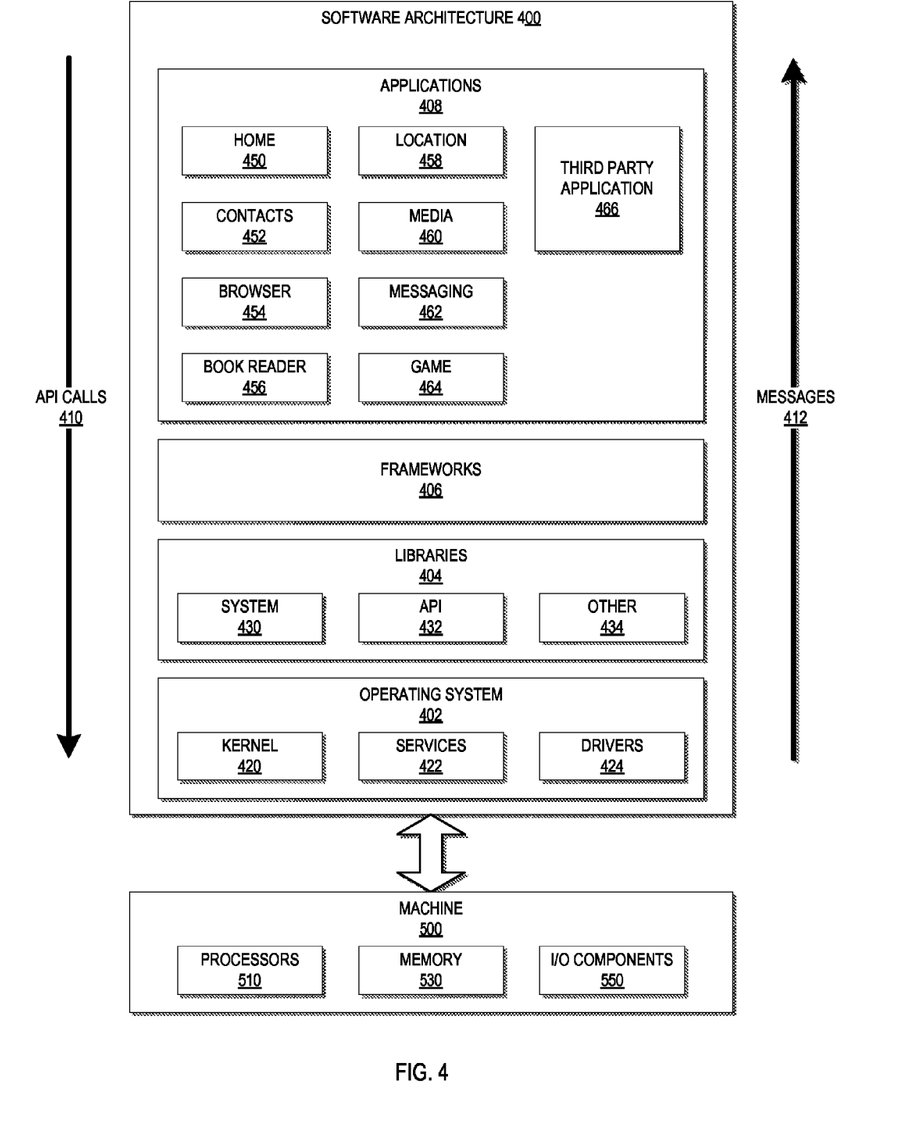
FIG. 4 is a block diagram illustrating a software architecture, in accordance with an example embodiment, that may be installed on a machine.

FIG. 4 is a block diagram illustrating an architecture of software 400, portions or the entirety of which may be installed on one or more of the client device hosting the browser 104, the back-end server hosting the back-end application code 112 and the back-end debugger 106, and/or the computer hosting the debug manager 108 depicted in FIG. 1. FIG. 4 is merely a non-limiting example of a software architecture and it will be appreciated that many other architectures may be implemented to facilitate the functionality described herein. The software 400 may be executing on hardware such as machine 500 of FIG. 5 that includes processors 510, memory 530, and I/O components 550. In the example architecture of FIG. 4, the software 400 may be conceptualized as a stack of layers where each layer may provide particular functionality. For example, the software 400 may include layers such as an operating system 402, libraries 404, frameworks 406, and applications 408. Operationally, the applications 408 may invoke application programming interface (API) calls 410 through the software stack and receive messages 412 in response to the API calls 410.

The operating system 402 may manage hardware resources and provide common services. The operating system 402 may include, for example, a kernel 420, services 422, and drivers 424. The kernel 420 may act as an abstraction layer between the hardware and the other software layers. For example, the kernel 420 may be responsible for memory management, processor management (e.g., scheduling), component management, networking, security settings, and so on. The services 422 may provide other common services for the other software layers. The drivers 424 may be responsible for controlling and/or interfacing with the underlying hardware. For instance, the drivers 424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 404 may provide a low-level common infrastructure that may be utilized by the applications 408. The libraries 404 may include system libraries 430 (e.g., C standard library) that may provide functions such as memory allocation functions, string manipulation functions, mathematic functions, and the like. In addition, the libraries 404 may include API libraries 432 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 404 may also include a wide variety of other libraries 434 to provide many other APIs to the applications 408.

The frameworks 406 may provide a high-level common infrastructure that may be utilized by the applications 408. For example, the frameworks 406 may provide various graphic user interface (GUI) functions, high-level resource management, high-level location services, and so forth. The frameworks 406 may provide a broad spectrum of other APIs that may be utilized by the applications 408, some of which may be specific to a particular operating system or platform.

The applications 408 include a home application 450, a contacts application 452, a browser application 454, a book reader application 456, a location application 458, a media application 460, a messaging application 462, a game application 464, and a broad assortment of other applications such as third-party application 466. In a specific example, the third-party application 466 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 466 may invoke the API calls 410 provided by the mobile operating system 402 to facilitate functionality described herein.

Example Machine Architecture and Machine-Readable Medium

Figure 5:
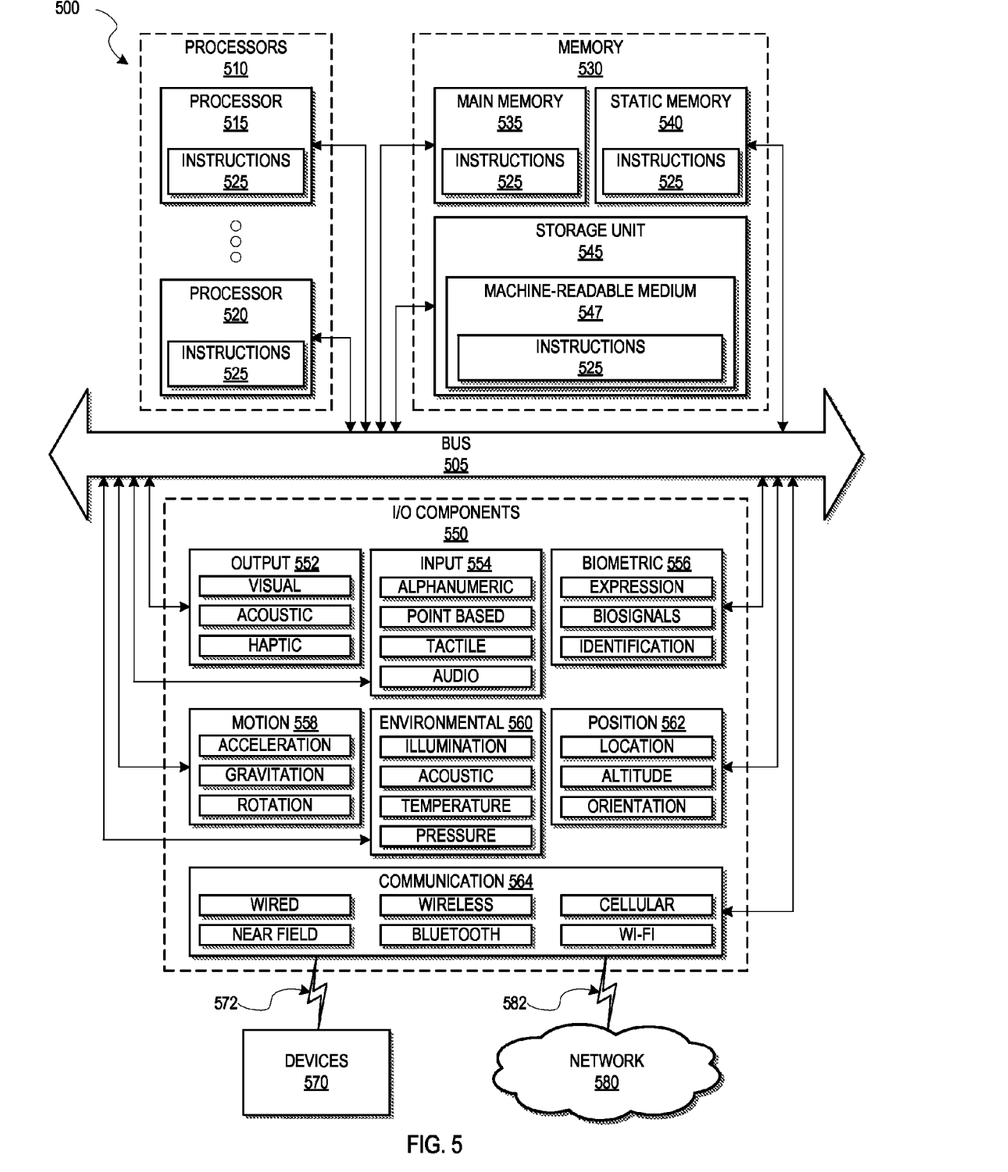
FIG. 5 is a diagrammatic representation of a machine in the form of a computer system within which a set of instructions may be executed for causing the machine to perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 525 (e.g., software, a program, an application, an applet, an app, or other executable code) for causing the machine 500 to perform any one or more of the methodologies discussed herein may be executed. In alternative example embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 525, sequentially or otherwise, that specify actions to be taken by machine 500. Further, while only a single machine 500 is illustrated, the term "machine" shall also be taken to include a collection of machines 500 that individually or jointly execute the instructions 525 to perform any one or more of the methodologies discussed herein.

The machine 500 may include processors 510, memory 530, and I/O components 550, which may be configured to communicate with each other via a bus 505. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 515 and processor 520 that may execute instructions 525. The term "processor" is intended to include multi-core processor that may comprise two or more independent processors (also referred to as "cores") that may execute instructions contemporaneously. Although FIG. 5 shows multiple processors 510, the machine 500 may include a single processor with a single core, a single processor with multiple cores (e.g., a multi-core process), multiple processors with a single core, multiple processors with multiples cores, or any combination thereof.

The memory 530 may include a main memory 535, a static memory 540, and a storage unit 545 accessible to the processors 510 via the bus 505. The storage unit 545 may include a machine-readable medium 547 on which are stored the instructions 525 embodying any one or more of the methodologies or functions described herein. The instructions 525 may also reside, completely or at least partially, within the main memory 535, within the static memory 540, within at least one of the processors 510 (e.g., within a processor's cache memory), or any suitable combination thereof, during execution thereof by the machine 500. Accordingly, the main memory 535, static memory 540, and the processors 510 may be considered as machine-readable media 547.

As used herein, the term "memory" refers to a machine-readable medium 547 able to store data temporarily or permanently and may be taken to include, but not be limited to, random-access memory (RAM), read-only memory (ROM), buffer memory, flash memory, and cache memory. While the machine-readable medium 547 is shown in an example embodiment to be a single medium, the term "machine-readable medium" should be taken to include a single medium or multiple media (e.g., a centralized or distributed database, or associated caches and servers) able to store instructions 525. The term "machine-readable medium" shall also be taken to include any medium, or combination of multiple media, that is capable of storing instructions (e.g., instructions 525) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 550 may include a wide variety of components to receive input, provide and/or produce output, transmit information, exchange information, capture measurements, and so on. It will be appreciated that the I/O components 550 may include many other components that are not shown in FIG. 5. In various example embodiments, the I/O components 550 may include output components 552 and/or input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instrument), tactile input components (e.g., a physical button, a touch screen that provides location and force of touches or touch gestures, and/or other tactile input components), audio input components (e.g., a microphone), and the like.

In further example embodiments, the I/O components 550 may include biometric components 556, motion components 558, environmental components 560, and/or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 562 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 and/or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine and/or any of a wide variety of peripheral devices (e.g., a peripheral device couple via a Universal Serial Bus (USB)).

Moreover, the communication components 564 may detect identifiers and/or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 525 may be transmitted and/or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 525 may be transmitted and/or received using a transmission medium via the coupling 572 (e.g., a peer-to-peer coupling) to devices 570. The term "transmission medium" shall be taken to include any intangible medium that is capable of storing, encoding, or carrying instructions 525 for execution by the machine 500, and includes digital or analog communications signals or other intangible media to facilitate communication of such software.

Furthermore, the machine-readable medium 547 is non-transitory (in other words, not having any transitory signals) in that it does not embody a propagating signal. However, labeling the machine-readable medium 547 as "non-transitory" should not be construed to mean that the medium is incapable of movement; the medium should be considered as being transportable from one physical location to another. Additionally, since the machine-readable medium 547 is tangible, the medium may be considered to be a machine-readable device.

TERM USAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of example embodiments of the present disclosure as represented by the appended claims. The specification and drawings are, accordingly, to be regarded in an illustrative rather than a restrictive sense.

What is claimed is:

1. A system to facilitate debugging a web application comprising front-end code and back-end code from within a front-end debugger integrated in a web browser executing on a client device, the system comprising one or more processors implementing a plurality of modules, the modules comprising:

a debug manager connectable to the web browser and a back-end debugger hosted on a back-end application server, the back-end debugger and the front-end debugger being different types of debuggers, the debug manager configured to provide a connection service to identify, in response to receipt, from the client device, of a network request to the back-end application server detected during debugging of the front-end code with the web browser, a client-server connection with which the network request is associated and a server computer of the back-end application server to process the network request, and a debug-request service to cause debug requests for the back-end code, received from a developer at the front-end debugger and sent from the front-end debugger to the debug manager, to be translated into a format specific to and adapted for processing by the back-end debugger.

2. The system of claim 1, further comprising:

at least one front-end adapter for connection between the front-end debugger and the debug manager, the front-end adapter configured to convert debug request sent from the front-end debugger to the debug manager into a generic representation, wherein the debug-request service causes the debug request to be translated from the generic representation into the format adapted for processing by the back-end debugger.

3. The system of claim 2, wherein the at least one front-end adapter comprises a browser plugin residing on the client device and a front-end plugin residing on a computer hosting the debug manager, the browser plugin being configured to convert a debug request received from the browser debugger executing on the client device into a debug-request message for transmission via a network to the front-end plugin, and the front-end plugin being configured to convert the debug-request message into the generic representation.

4. The system of claim 2, further comprising:
one or more back-end plugins associated with one or more respective back-end debuggers, each back-end plugin being configured to translate the debug requests from the generic representation into a format specific to and adapted for processing by the respective back-end debugger.

5. The system of claim 1, further comprising the browser debugger executing on the client device, for debugging the front-end code of the web application and for causing debug requests for debugging the back-end code of the web application to be transmitted to the debug manager.

6. The system of claim 1, further comprising the back-end debugger.

7. The system of claim 1, wherein the debug request service is further to cause the translated debug requests to be forwarded to the back-end debugger.

8. The system of claim 7, wherein the debug request service is further configured to forward a response to the debug request from the back-end debugger to the client device.

9. The system of claim 1, wherein the debug request service is capable of sending the translated debug requests to the back-end debugger asynchronously for synchronous debug requests received from the client device, or synchronously for asynchronous debug requests received from the client device.

10. A method for debugging a web application comprising front-end code executing on a client device and back-end code executing on a back-end application server, the method comprising:
during debugging of the front-end code of the web application with a front-end debugger executing on one or more hardware processors of the client device, detecting at the client device, a network request for service by the back-end application server and forwarding the request to a debug manager; and
at the debug manager,
identifying, in response to receipt of the request, a client-server connection associated with the network request and a server computer of the back-end application server to process the network request;
retrieving, from the identified server computer, a code portion of the back-end code configured to service the network request, and forwarding the code portion to the front-end debugger; and
in response to receipt, from the front-end debugger, of a debug request message including a back-end debug request, translating the back-end debug request into a format specific to and adapted for processing by a back-end debugger associated with the identified server computer, the back-end debugger and the front-end debugger being different types of debuggers.

11. The method of claim 10, further comprising displaying the code portion in the front-end debugger.

12. The method of claim 10, further comprising sending the translated back-end debug request to the back-end debugger.

13. The method of claim 12, further comprising executing the back-end debug request by the back-end debugger.

14. The method of claim 10, further comprising forwarding, by the debug manager, a response to the back-end debug request from the back-end debugger to the front-end debugger.

15. The method of claim 10, further comprising receiving a back-end debug request from a user at the front-end debugger, and sending the back-end debug request with the debug request message to the debug manager.

16. The method of claim 10, wherein translating the received debug request comprises converting the debug request, by a front-end plugin associated with the debug manager, into a generic representation, and converting the generic representation, by a back-end plugin associated with the debug manager, into the format adapted for processing by the back-end debugger.

17. A non-transitory machine-readable medium storing instructions for managing debugging of a web application comprising front-end code executing on a client device and back-end code executing on a back-end application server, the instructions, when executed by at least one processor, causing the at least one processor to perform operations comprising:
identifying, in response to receipt, from a front-end debugger executing on the client device, of a network request to the back-end application server detected during debugging of the front-end code, a client-server connection associated with the network request and a server computer of the back-end application server to process the network request;
retrieving, from the identified server computer, a back-end code portion configured to service the network request, and forwarding the code portion to the front-end debugger; and
in response to receipt, from the front-end debugger, of a debug request message including a back-end debug request, translating the back-end debug request into a format specific to and adapted for processing by a back-end debugger associated with the identified server computer, the back-end debugger and the front-end debugger being different types of debuggers.

18. The non-transitory machine-readable medium of claim 17, wherein the instructions, when executed, further cause the at least one processor to send the translated back-end debug request to the back-end debugger.

19. The non-transitory machine-readable medium of claim 17, wherein the instructions, when executed, further cause the at least one processor to forward a response to the back-end debug request from the back-end debugger to the front-end debugger.

20. The non-transitory machine-readable medium of claim 17, wherein the instructions, when executed, cause the at least one processor to translate the received debug request by converting the debug request into a generic representation and converting the generic representation into the format adapted for processing by the back-end debugger.

* * * * *